United States Patent
Wong et al.

(10) Patent No.: US 7,072,460 B2
(45) Date of Patent: Jul. 4, 2006

(54) SYSTEM AND METHOD FOR RETRIEVING TELEPHONE NUMBERS

(75) Inventors: Kent Wah Shun Wong, Hong Kong (HK); Gary Rogalski, Richmond (CA)

(73) Assignee: VTech Telecommunications Limited, Hong Kong (HK)

( * ) Notice: Subject to any disclaimer, the term of this patent is extended or adjusted under 35 U.S.C. 154(b) by 360 days.

(21) Appl. No.: 10/445,253

(22) Filed: May 27, 2003

(65) Prior Publication Data

US 2004/0240660 A1 Dec. 2, 2004

(51) Int. Cl.
H04M 1/26 (2006.01)
(52) U.S. Cl. .................................. 379/355.05; 455/564
(58) Field of Classification Search ................. 379/365.01–357.05; 455/564
See application file for complete search history.

(56) References Cited

U.S. PATENT DOCUMENTS

| | | | |
|---|---|---|---|
| 4,829,563 A | 5/1989 | Crockett et al. | |
| 5,155,763 A | 10/1992 | Bigus et al. | |
| 5,341,412 A | 8/1994 | Ramot et al. | |
| 5,796,791 A | 8/1998 | Polcyn | |
| 6,198,814 B1 | 3/2001 | Gill | |
| 6,285,753 B1 * | 9/2001 | Slusher | 379/355.06 |
| 2003/0174833 A1 | 9/2003 | Wang | |
| 2004/0018857 A1 * | 1/2004 | Asokan et al. | 455/564 |

FOREIGN PATENT DOCUMENTS

| | | |
|---|---|---|
| EP | 0 920 168 | 6/1999 |
| EP | 0 951 163 | 10/1999 |
| EP | 1 006 704 | 6/2000 |
| EP | 1 146 716 | 10/2001 |
| GB | 2 300 331 | 10/1996 |
| GB | 2 351 631 | 1/2001 |
| WO | WO 2004/012428 | 2/2004 |

OTHER PUBLICATIONS

GB Search Report dated Sep. 28, 2004.

* cited by examiner

Primary Examiner—Daniel Swerdlow
(74) Attorney, Agent, or Firm—Pillsbury Winthrop Shaw Pittman LLP

(57) ABSTRACT

A system and method for quickly retrieving a telephone number is disclosed. The system includes an input device for inputting a dial string from a user, a storage device for storing a plurality of telephone numbers, a display device for displaying the dial string, and a processor for matching the dial string with telephone numbers stored in the storage device. The dial string includes one or more digits. The processor matches the one or more digits with telephone numbers stored in the storage device and retrieves the telephone numbers. Each of the retrieved telephone number includes all digits of the dial string. The retrieved telephone numbers are then displayed on the display device. After the user selects one of the displayed telephone numbers, the system performs an action with the telephone number. For example, the system can be configured to dial the selected telephone number.

25 Claims, 3 Drawing Sheets

SYSTEM AND METHOD FOR RETRIEVING TELEPHONE NUMBERS

BACKGROUND

1. Field of the Invention

The present invention relates generally to a telephony device and, more particularly, to a telephony device that retrieve one or more telephone numbers using a dial string.

2. Background of the Invention

Telephony devices today, be it conventional PSTN in nature or cellular, still require the user to manually enter all the digits to be dialed. Although many telephone sets are equipped with a phonebook, the selection of an individual phonebook entry must still be done either by scrolling through a list or by entering in a name or portion of a name corresponding to the phonebook entry to be dialed. Both methods are somewhat cumbersome and time consuming.

One solution that aids users to retrieve all the digits more quickly involves a name matching function. Such name matching function is incorporated within many telephony devices today. In many phonebooks, both names and numbers are stored together. User invariably recalls names more readily than numbers so provisions are made to facilitate entry of roman characters corresponding to a specific entry (in whole or in part) and to then have the device "search" for possible matches based on the roman characters.

SUMMARY OF THE INVENTION

The present invention provides a telephony device that receives one or more digits entered by a user to "predict" which telephone number or numbers the user is trying to retrieve from a memory, and to present those telephone numbers to the user.

One embodiment of the invention provides a telephony device that includes an input device, a processor, and a display device. The telephony device can be, for example, a telephone set. Alternatively, the telephony device can be a computer that is coupled with a modem. The input device is configured to receive a dial string from a user. The dial string includes one or more digits input by the user. The processor is in communication with the input device. The processor is configured to retrieve one or more telephone numbers from a storage device based on the dial string. Each of the one or more telephone numbers includes one or all of the digits of the dial string. The display device is configured to display the one or more telephone numbers.

Preferably, the telephony device further includes an interface. The interface is configured to solicit the user to select one of the telephone numbers displayed on the display device. Preferably, an increase in a length of the dial string results in fewer telephone numbers to be displayed on the displayed device.

In one aspect of the invention, there are a number of possible relationships between the dial string and the telephone numbers. For example: (1) the dial string can include at least two digits and each of the one or more telephone numbers includes the at least two digits; (2) first two digits of each of the one or more telephone numbers correspond with the at least two digits; (3) last two digits of each of the one or more telephone numbers correspond with the at least two digits; (4) a length of the dial string is shorter than a length of each of the one or more telephone numbers.

In another aspect of the invention, the telephony device can be configured to display fewer than ten telephone numbers on the display device. Preferably, there are fewer than five telephone numbers displayed on the display device. Preferably, the dial string includes at least four digits and each of the one or more telephone numbers includes the at least four digits.

In another embodiment, the invention provides a method that performs the following functions: (1) storing telephone numbers in a storage device accessible to a telephony device; (2) receiving a dial string at the telephony device, wherein the dial string includes one or more digits; (3) retrieving one or more telephone numbers from the storage device based on the dial string, wherein each of the one or more telephone numbers includes one or all of the digits of the dial string; and (4) displaying the one or more telephone numbers on a display device of the telephony device.

Preferably, the method can be configured to further include (5) receiving a selection of one of the one or more telephone numbers; and (6) using the telephone number associated with the selection to perform a task. The task can be, for example, dialing the telephone number.

In one aspect, the method is configured to solicit a user to select one of the telephone numbers displayed on the display device.

In another aspect, the method is configured so that the dial string includes at least two digits appearing in an order and each of the one or more telephone numbers includes the at least two digits appearing not in the order.

In another aspect, the method is configured so that each of the one or more telephone numbers includes the at least two digits appearing in the order.

In another aspect, the method is configured so that first two digits of each of the one or more telephone numbers correspond with first two digits of the dial string.

In another aspect, the method is configured so that last two digits of each of the one or more telephone numbers correspond with last two digits of the dial string.

Another embodiment of the invention provides a telephony device that includes a storage device, an output device, a display device, and a processor. The storage device is configured to store telephone numbers. The input device is configured to receive a dial string having one or more digits. The display device is configured to display telephone numbers retrieved from the storage device. The processor is in communication with the storage device, the input device, and the display device. The processor is configured to perform the following tasks:

process the dial string received from the input device;

access the storage device to retrieve one or more telephone numbers based on the dial string, wherein each of the one or more telephone numbers includes one or more digits of the dial string;

present the one or more telephone numbers on the display device;

receive an instruction to dial one of the one or more telephone numbers; and dial the one telephone number associated with the instruction.

In another embodiment, the invention provides a telephony device having an interface that is configured to:

receive a dial string of one or more digits;

display one or more telephone numbers having the one or more digits;

present the one or more telephone numbers;

solicit an instruction to dial one of the one or more telephone numbers; and dial the telephone number associated with the instruction.

DETAILED DESCRIPTION OF THE INVENTION

As disclosed herein, telephony devices include any apparatus that can be used to initiate or receive a telephone call, or is otherwise configured to utilize the PSTN for voice and data communication. For example, telephony devices include telephone sets (conventional, cordless, cellular, etc.) as well as computers that are equipped to communicate via the PSTN or other telephone networks.

Figure 1:
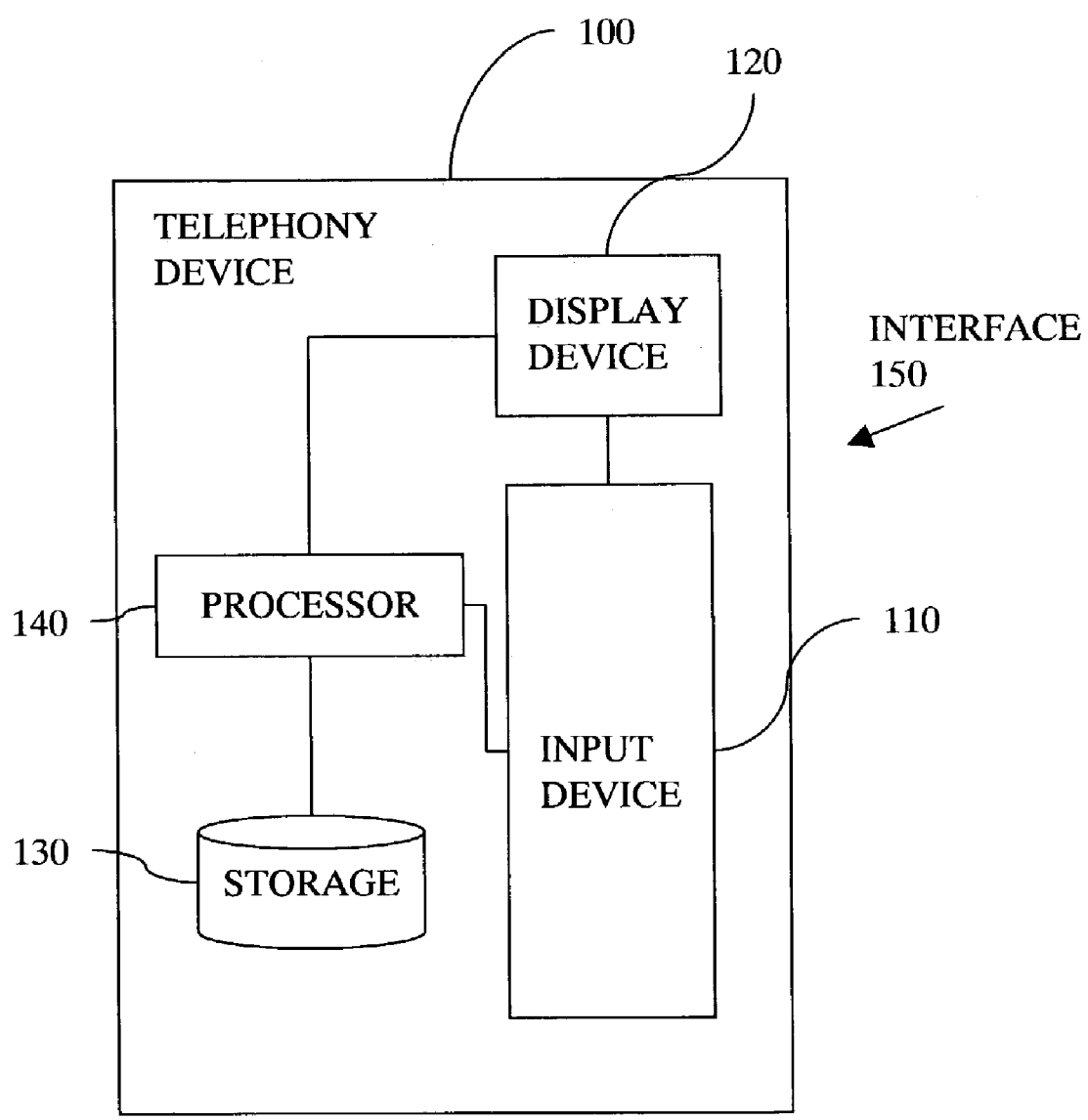
FIG. 1 is a schematic diagram showing an exemplary layout of a telephony device of the invention.

FIG. 1 is a schematic diagram showing an exemplary layout of a telephony device of the invention. For convenience, telephony device 100 is described below as a telephone. In other implementation, telephony device 100 can be any device used to initial or receive a telephone call.

Telephony device 100 includes input device 110, display device 120, storage device 130, and processor 140. Processor 140 is configured to communicate with each of input device 110, display device 120, and storage device 130.

Input device 110 can be any device that can be used to input information into storage device 130 or otherwise manipulate processor 140. For example, input device 110 can include one or more of a keyboard, a pointing device, or other known device that can be used to perform the functions described herein.

Preferably, input device 110 is a standard telephone keypad that includes, for example, the 0, 1, 2, 3, 4, 5, 6, 7, 8, 9, *, and # keys. When a key on input device 110 is pressed, the character associated with the key is shown on display device 120. Through manipulation of input device 110, information can be stored in and retrieved from storage device 130. In addition, input device 110 can be used to provide instructions to processor 140.

Display device 120 can be any display device including a computer monitor and a standard LCD device typically found on telephone sets. Display device 120 is shown to be an integral unit of telephony device 100, but it can also be a separate unit configured to communicate with telephony device 100. Preferably, display device 120 can display each character associated with input device 110. Display device 120 is configured to display at least one line of characters. Preferably, display device 120 can display two or more lines of characters. Preferably, as input device 110 is being used, display device 120 shows the information being processed by processor 140.

Storage device 130 can be any storage device that is configured to store information. For example, storage device 130 can be used to store an address book. The address books preferably associate names with telephone numbers. Preferably, storage device 130 can accommodate one or more telephone numbers input by a user, one or more dialed telephone numbers, and one or more telephone numbers that called a telephone number associated with telephony device 100. Storage device 130 is shown to be an integral unit of telephony device 100, but it can also be a separate unit configured to communicate with telephony device 100.

Processor 140 can be a standard processor that is commonly used for telephony devices. Processor 140 is configured to perform, among other tasks, the following:

Receive a dial string having one or more character when appropriate keys on input device 110 are pressed;

Display the dial string on display device 120;

Store a telephone numbers in storage device 130;

Retrieve a full telephone number from storage device 130 based on a dial string received from input device 110;

Prompt for a confirmation to dial the retrieved telephone number; and

Dial the retrieved telephone number.

For example, if a telephone number "313-333-3333" is previously stored in storage device 130 and when a partial dial string "3" is received from input device 110, processor 140 can retrieve the entire telephone number "313-333-3333" on display device 120 and prompting a user to confirm a desire to dial the telephone number, assuming "313-333-3333" is the only telephone number in storage 140 that includes the number "3."

Interface 150 can include a menu driven user interface that can display information on display device 120 and solicit input from a user. Preferably, interface 150 can be configured to receive verbal instructions from the user. For example, interface 150 can be configured to recognize the voice of the user.

Figure 2:
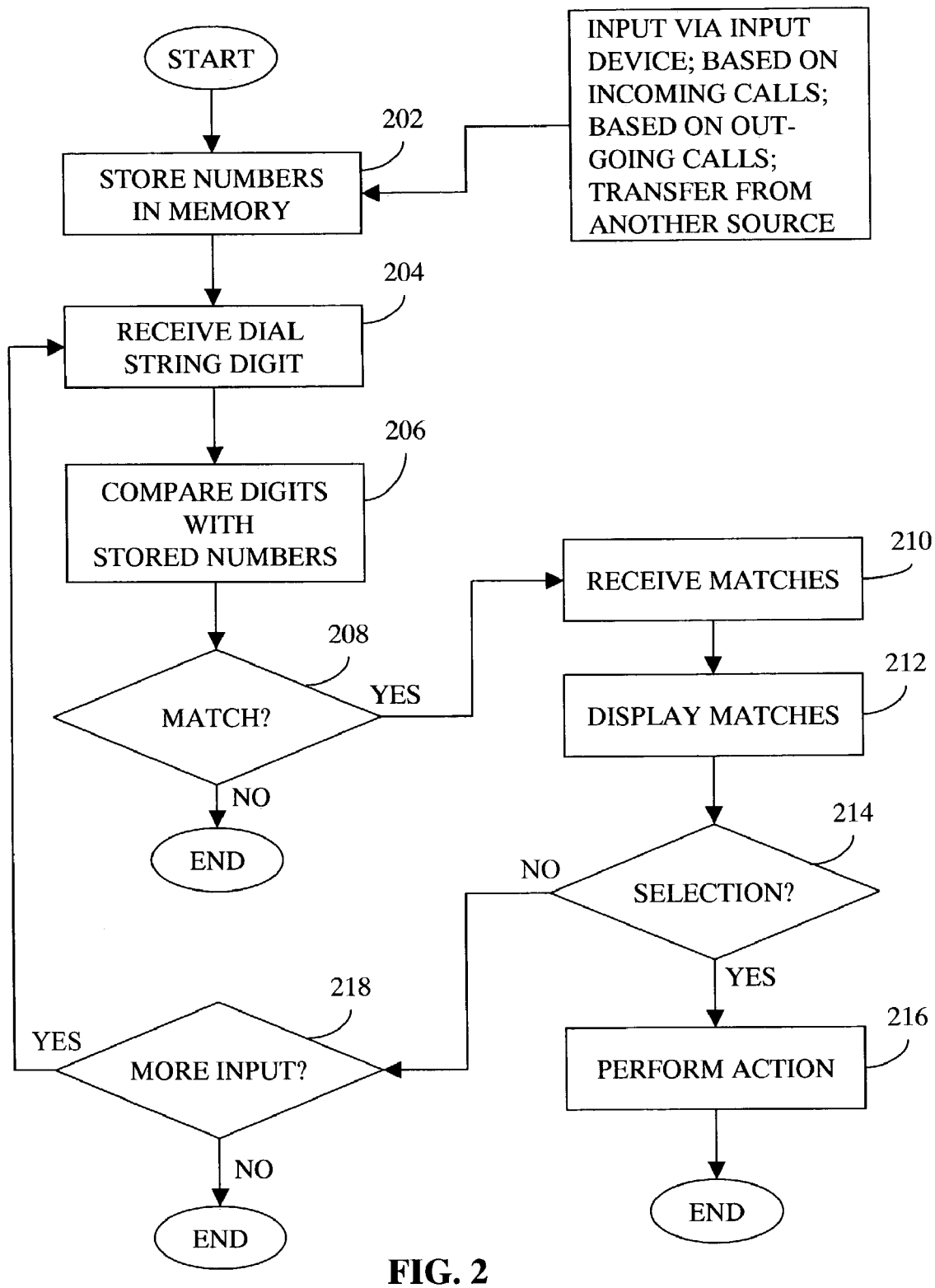
FIG. 2 is an exemplary flowchart showing exemplary steps of one embodiment of the invention.

In an exemplary implementation of the invention as shown in FIG. 2, the following steps may be implemented in one preferred embodiment of the invention.

In step 202, telephone numbers are stored in storage device 130. A number of methods can be used to store the telephone numbers. One method for inputting the telephone numbers is to use input device 110 or interface 150. Another method for inputting the telephone numbers is to receive the telephone numbers using a known data transfer mechanism. For example, telephone numbers can be digitally transferred to storage device 130 by using known computer technologies. Another method for inputting the telephone number involves capturing recently dialed telephone numbers that were used to generate outgoing calls. Still another method for inputting the telephone numbers involve capturing calling numbers associated with incoming calls.

Once stored in storage device 130, the telephone numbers can be organized. Organization of the telephone numbers in storage device 130 can be done in many different ways. For example, the telephone numbers can be organized in storage device 130 in a numerical order. Alternatively, the telephone numbers can be organized in the order in which they were received by storage device 130. Other known organization methods may be used.

For discussion purposes, assume that storage device 130 includes the telephone numbers organized as shown in Table 1 below.

TABLE 1

Exemplary List of Stored Telephone Numbers

| Telephone Numbers | Name |
|---|---|
| 202-111-1111 | John Smith |
| 202-111-2222 | Mary Jones |
| 212-222-2224 | "Last Dialed Number" |
| 313-333-3333 | "Last Calling Number" |
| 414-444-4444 | Phone Company Customer Service |

Telephone numbers "202-111-1111" and "202-111-2222" are telephone numbers that have been input by a user of device 100 using one or both of input device 110 and interface 150. The names associated with these two telephone numbers may be input by the user via input device 110 or interface 150. Alternatively, the names may be retrieved from a telephone directory through other means.

Telephone number "212-222-2224" is the telephone number that was most recently dialed at telephony device 100 for generating an outgoing call. Preferably, more than one recently dialed telephone numbers can be stored in storage device 130.

Telephone number "313-333-3333" is the telephone number that is associated with the most recently received incoming call. This number can be obtained using known methods, including, for example, a Caller ID type service. Preferably, more than one recent calling telephone numbers can be stored in storage device 130.

Telephone number "414-444-4444" is a telephone number that was stored in storage device 130 using a data transfer method. For example, a telephone company that provides telephone services can transfer the telephone number to storage device 130.

In addition, additional "preprogrammed" telephone numbers can be pre-stored in storage device 130. For example, a manufacturer of device 100 can store a list of telephone numbers in Table 1. Pre-stored telephone numbers can include the telephone number of the customer service department of device 100, emergency telephone numbers, and other telephone numbers.

In step 204, a dial string is received. The dial string can include one or more digits. The dial string can be received, for example, by processor 140, when a key on input device 110 is pressed or the dial string is otherwise received via interface 150. In view of Table 1, steps 206–218 can take place as follows, depending on what is received in step 204.

EXAMPLE 1

One of the "9," "8," "7," "6," and "5" keys is the first key to be pressed on input device 110 and received by processor 140 in step 204.

In step 206, processor 140 compares the dial string with the telephone numbers of Table 1, which is accessible in storage device 130. In step 208, as processor 140 determines that none of the telephone numbers in storage device 130 matches the dial string, the process ends.

EXAMPLE 2

The "3" key is the first key to be pressed on input device 110 and received by processor 140 in step 204.

In step 206, processor 140 compares the dial string with the telephone numbers shown of Table 1, which is accessible in storage device 130.

In step 208, processor 140 determines that telephone number "313-333-3333" is the only telephone number that matches the dial string. The process goes to step 210.

In step 210, processor 140 retrieves the telephone number "313-333-3333" from storage device 130. Note that one digit of the dial string results in the retrieval of all ten digits of the telephone number.

In step 212, the telephone number is presented on display device 120.

In step 214, if a user selects an action associated with the telephone number, the process goes to step 216, otherwise, the process goes to step 218.

In step 216, the action may be, for example, to dial the telephone number. Another action may be, for example, to edit the telephone number, to send the telephone number to another entity, or to remove the telephone number from Table 1. Other actions may be performed in step 216.

In step 218, if one or more digits are received, the process returns to step 204. Otherwise, the process ends.

EXAMPLE 3

The "4" key is the first key to be pressed on input device 110 and received by processor 140 in step 204.

In step 206, processor 140 compares the dial string that includes the digit "4" with the telephone numbers shown of Table 1, which is accessible in storage device 130.

In step 208, processor 140 determines that there are two telephone numbers that match the dial string. Specifically, as shown in Table 1, each of telephone numbers "414-444-4444" and "212-222-2224" includes the digit "4" in it.

In step 210, processor 140 retrieves the telephone numbers "414-444-4444" and "212-222-2224" from storage device 130.

In step 212, these two telephone numbers are presented on display device 120. Preferably, "414-444-4444" is displayed as a first choice since it begins with the digit "4."

In step 214, if a user selects an action, the process goes to step 216, otherwise, the process goes to step 218. For example, the user in step 214 can select one of the two displayed telephone numbers.

If the user did not choose any of the telephone numbers displayed, the process goes to step 218. In step 218, processor 140 receives a second digit for the dial string. Depending on how processor 140 is configured, the input of the second digit can result in several different scenarios.

For example, in a first scenario, processor 140 is configured to interpret the second digit to be sequential in nature with respect to the first digit in the telephone numbers stored in storage device 130. In this scenario, if the second digit is "1", the subsequent process in steps 206, 208, 210, and 212 would result in the display of "414-444-4444" and not "212-222-2224" on display device 120 because "1" (the second digit received) follows "4" (the first digit received). In this scenario, if the second digit is a digit other than "1", no telephone numbers would be displayed and the process ends after step 208.

In a second scenario, processor 140 is configured to interpret the second digit to be any number found in the telephone numbers stored in storage device 130. In the second scenario, if the second digit is "1", the subsequent process in steps 206, 208, 210, and 212 would result in the display of both "414-444-4444" and "212-222-2224" on display device 120 because "1" (the second digit received) is found in both "414-444-4444" and "212-222-2224". In this scenario, there is no restriction that the second digit received must follow the first digit received in the telephone numbers.

The invention is not limited to the specific examples and scenarios discussed. Indeed, there are a large number of possibilities on how processor 140 can be configured to interpret the significance of each digit received. Furthermore, processor 140 can be configured to process more than two digits received.

In step 216, the action may be, for example, to dial the telephone number. Another action may be, for example, to edit the telephone number. Other known actions may be performed in step 216.

Accordingly, one aspect of the invention provides a method to enhance the dialing function by attempting to successively match the digits of the dial string being entered with telephone numbers which are already stored within storage device 130. In another embodiment, the invention can be configured to display only unique matches once sufficient digits have been entered. In another embodiment, the invention can be configured to display all possible matches and to reduce the list as additional digits are entered or it could be configured to display. The invention preferably provides an interface that allows a user of the invention the option to continue entering digits or to select one of the "predicted" numbers.

In a preferred embodiment, the telephony device of the invention provides a simple, automatic and predictive nature of the telephone number dialing function. Most telephony devices today are LCD equipped and, therefore, support a function called predial. Predial is simply number entry before line access (or network access in the case of mobile phones). This function is available from the standby state and does not require the user to enter into any specific mode of operation. It is therefore the dialing method would require the fewest number of steps. Providing a method to further optimize this already simple dialing method without requiring the user to do anything but to dial normally, greatly enhances the device functionality.

In its simplest form, the device would keep a copy of the numbers stored in the memory corresponding to that that will be "searched" (Speed dial, CID, Redial, etc.) This list would be sorted and as digits are entered via the input device, an algorithm would attempt to match the entered digits to numbers or portions of numbers in the list. If a match or partial match is found, the complete entry is then retrieved from memory (name only, number only, or name and number) and then displayed as an option (or options if there is more than one possible match) to complete the dial string entry.

The predicted part of the number could be highlighted in some manner so as to distinguish it from the part of the number entered manually. The user could then simply press the dial key (or send in the case of cellular) to accept the predicted number or continue to enter digits, in which case the predicted digits would be cleared until the next prediction.

Figure 3:
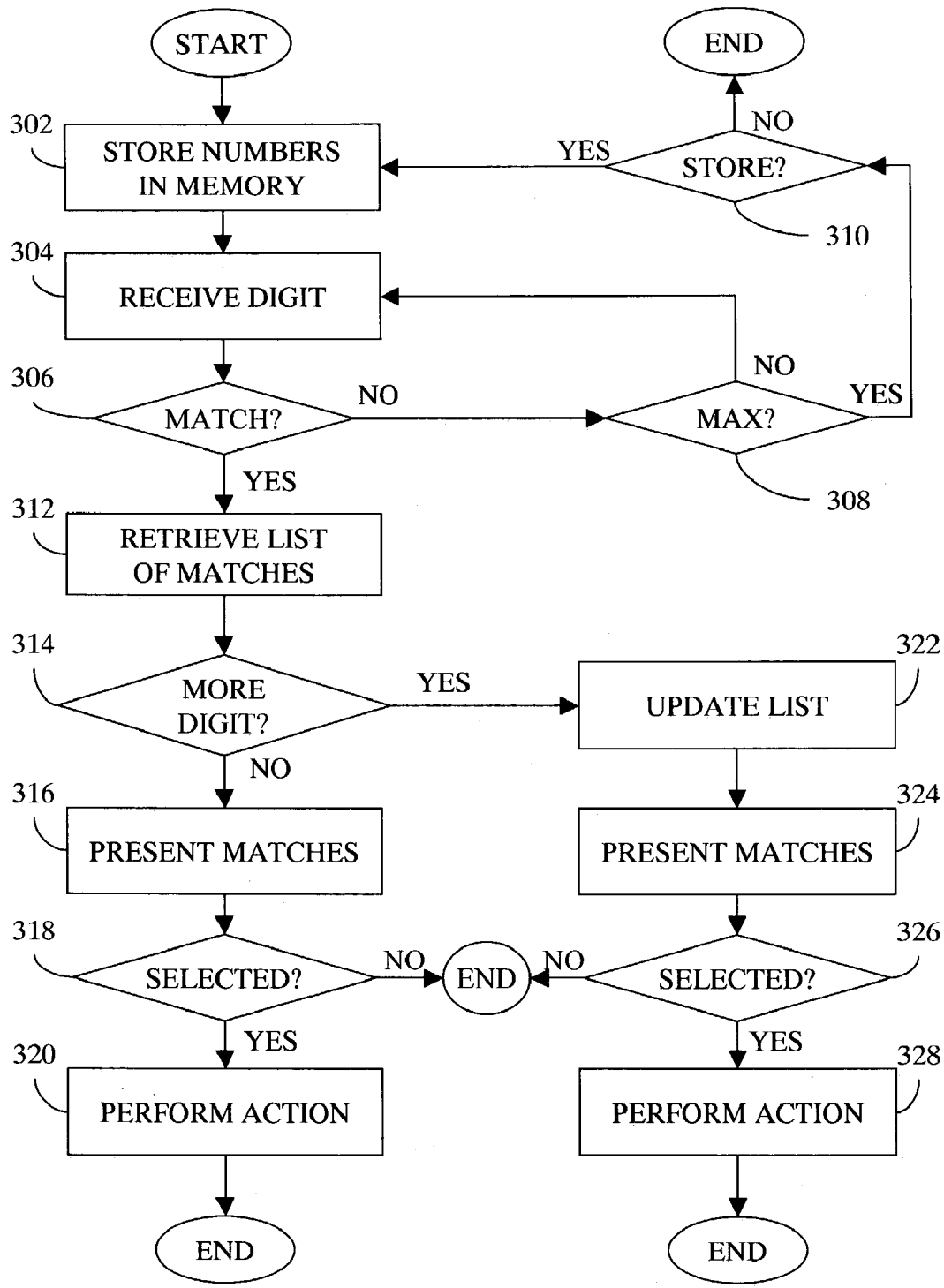
FIG. 3 is a flowchart showing exemplary steps that can take place in another embodiment of the invention.

FIG. 3 is a flowchart showing exemplary steps that can take place in another embodiment of the invention.

In step 302, telephone numbers are stored in a memory that is accessible to a telephony device of the invention. An example of the memory is storage device 130. For example, actions similar to those described in step 202 above may be taken.

In steps 304, 306, and 308, one or more digits of a dial string is received. As soon as a sufficient number of digits is received to result in a match of telephone numbers in step 306, the process goes to step 312. Otherwise, additional digits are received and the process returns to step 304 until a maximum number of digits have been received in step 308. The maximum number may be, for example, 10. When the maximum number of digits have been received, the process goes to step 310.

In step 310, interface 150 of the invention asks whether the user would like to store the digits collected in steps 304, 306, and 308 as a telephone number in the memory. If so, the process goes to step 302 and the collected digits are stored as a telephone number. Otherwise, the process ends.

In step 312, a list of telephone numbers that match the digits is retrieved. For example, if three telephone numbers were determined in step 306 to match the digit or digits received in step 304, a list of the matched telephone numbers are retrieved from the memory.

In step 314, it is determined whether additional digits continued to be received. If not, the process goes to step 316. Otherwise, the process goes to step 322.

In step 316, the retrieved telephone numbers are presented. Presentation of the telephone numbers can be made on a display device. For example, retrieved telephone numbers can be displayed on display device 120.

In step 318, if there are multiple telephone numbers presented, interface 150 interacts with the user to choose one of the choices. If only one telephone number is presented, interface 150 asks whether the user would like to perform an action using the telephone number. The process ends if the user decides to take no action in step 318.

In step 320, an action is performed if an affirmative selection or confirmation is received in step 318. The action can be, for example, dialing the telephone number selected or confirmed in step 318.

In step 322, if more digits are received in step 314, the list of telephone numbers obtained in step 312 is updated. In one exemplary implementation of this step, a size of the list of the telephone numbers is reduced as the number of digits increases. In an example that the telephone numbers of Table 1 above is available in the memory, when there is only "2" in the dial string in step 306, the list would include three telephone numbers "202-111-1111," "202-111-2222," and "212-222-2224." If a second digit is received in step 314 to result in a new dial string of "20," then the list would be reduced to two telephone numbers, and "212-222-2224" would no longer be in the list.

In step 324, the reduced numbers are presented and the process continues in steps 326 and 328. In an exemplary implementation, step 326 can be similar or identical to step 318. Likewise, step 328 can be similar or identical to step 320.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A telephony device comprising:
an input device configured to receive a dial string, wherein the dial string includes at least two digits appearing in an order received from a user;

a processor in communication with the input device, wherein the processor is configured to retrieve one or more telephone numbers from a storage device based on the dial string, wherein each of the one or more telephone numbers includes the at least two digits appearing not in the order; and a display device configured to display the one or more telephone numbers.

2. The telephony device of claim 1, further comprising an interface configured to solicit the user to select one of the telephone numbers displayed on the display device.

3. The telephony device of claim 1, wherein an increase in a length of the dial string yields fewer telephone numbers to be displayed on the displayed device.

4. The telephony device of claim 1, wherein each of the one or more telephone numbers includes the at least two digits appearing in the order.

5. The telephony device of claim 4, wherein first two digits of each of the one or more telephone numbers correspond with the at least two digits.

6. The telephony device of claim 4, wherein last two digits of each of the one or more telephone numbers correspond with the at least two digits.

7. The telephony device of claim 1, wherein a length of the dial string is shorter than a length of each of the one or more telephone numbers.

8. The telephony device of claim 1, wherein there are fewer than ten telephone numbers displayed on the display device.

9. The telephony device of claim 1, wherein there are fewer than five telephone numbers displayed on the display device.

10. The telephony device of claim 1, wherein the dial string includes at least four digits and each of the one or more telephone numbers includes the at least four digits.

11. A method comprising:
storing telephone numbers in a storage device accessible to a telephony device;
receiving a dial string at the telephony device, wherein the dial string includes at least two digits appearing in an order;
retrieving one or more telephone numbers from the storage device based on the dial string, wherein each of the one or more telephone numbers includes the at least two digits appearing not in the order; and
displaying the one or more telephone numbers on a display device of the telephony device.

12. The method of claim 11, further comprising:
receiving a selection of one of the one or more telephone numbers; and
using the telephone number associated with the selection to perform a task.

13. The method of claim 11, further comprising soliciting a user to select one of the telephone numbers displayed on the display device.

14. The method of claim 11, wherein first two digits of each of the one or more telephone numbers correspond with first two digits of the dial string.

15. The method of claim 11, wherein last two digits of each of the one or more telephone numbers correspond with last two digits of the dial string.

16. A telephony device comprising:
a storage device configured to store telephone numbers;
an input device configured to receive a dial string having at least two digits appearing in an order;
a display device configured to display telephone numbers retrieved from the storage device; and
a processor in communication with the storage device, the input device, and the display device, wherein the processor is configured to:
process the dial string received from the input device;
access the storage device to retrieve one or more telephone numbers based on the dial string, wherein each of the one or more telephone numbers includes the at least two digits appearing not in the order;
present the one or more telephone numbers on the display device;
receive an instruction to dial one of the one or more telephone numbers; and
dial the one telephone number associated with the instruction.

17. The telephony device of claim 16, wherein each of the one or more telephone numbers includes all digits of the dial string.

18. The telephony device of claim 17, wherein the all digits appear in the dial string in one order and the all digits appear in the one or more telephone numbers in another order.

19. The telephony device of claim 17, wherein the all digits appear in the one or more telephone numbers as first digits of the one or more telephone numbers.

20. The telephony device of claim 17, wherein the all digits appear in the one or more telephone numbers as last digits of the one or more telephone numbers.

21. A telephony device comprising an interface configured to:
receive a dial string of at least two digits appearing in an order;
display one or more telephone numbers each having the at least two digits appearing not in the order;
present the one or more telephone numbers;
solicit an instruction to dial one of the one or more telephone numbers; and
dial the telephone number associated with the instruction.

22. The telephony device of claim 21, wherein first two digits of each of the one or more telephone numbers correspond with the at least two digits.

23. A method comprising:
storing a plurality of telephone numbers in a storage of a telephony device;
receiving a dial string at the telephony device, wherein the dial string includes at least two digits appearing in an order;
retrieving a group of telephone numbers from the storage, wherein each telephone number in the group includes the at least two digits appearing not in the order; and
displaying the group on a display of the telephony device.

24. The method of claim 23, further comprising:
receiving additional digits of the dial string;
reducing a size of the group of telephone numbers to form a reduced group, wherein each telephone number in the reduced group includes the additional digits of the dial string; and
displaying the reduced group on the display of the telephony device.

25. The method of claim 23, further comprising soliciting a user to select one of the telephone numbers displayed on the display device.

* * * * *